United States Patent
Samejima et al.

(10) Patent No.: US 9,485,682 B2
(45) Date of Patent: Nov. 1, 2016

(54) MOBILE TERMINAL TESTING APPARATUS AND INTERFERENCE STATE SIMULATING METHOD FOR USE IN THE SAME

(71) Applicant: ANRITSU CORPORATION, Kanagawa (JP)

(72) Inventors: Keiichiro Samejima, Kanagawa (JP); Satoshi Wakasa, Kanagawa (JP); Takayuki Koguchi, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 15/049,289

(22) Filed: Feb. 22, 2016

(65) Prior Publication Data

US 2016/0286422 A1    Sep. 29, 2016

(30) Foreign Application Priority Data

Mar. 27, 2015    (JP) ................. 2015-066372

(51) Int. Cl.
| | |
|---|---|
| H04B 17/00 | (2015.01) |
| H04W 24/00 | (2009.01) |
| H04W 24/08 | (2009.01) |
| H04B 17/345 | (2015.01) |
| H04W 16/22 | (2009.01) |

(52) U.S. Cl.
CPC .......... *H04W 24/08* (2013.01); *H04B 17/345* (2015.01); *H04W 16/22* (2013.01)

(58) Field of Classification Search
CPC ... H04W 24/00; H04W 24/06; H04W 24/08; H04W 88/02; H04B 17/00; H04B 17/0085; H04B 17/15; H04B 17/29; H04M 1/24

USPC .......... 455/67.11, 67.14, 423, 425; 370/241, 370/250, 252

See application file for complete search history.

(56) References Cited

U.S. PATENT DOCUMENTS

| | | | | |
|---|---|---|---|---|
| 6,978,131 | B1 * | 12/2005 | Lee .................... | H04B 17/0085 455/10 |
| 7,120,432 | B2 * | 10/2006 | Voyer .................... | H04W 16/18 455/423 |
| 7,620,368 | B2 * | 11/2009 | Wang .................... | H04B 17/20 455/67.14 |
| 8,526,939 | B2 * | 9/2013 | Harteneck .......... | H04B 17/3911 455/425 |
| 8,649,737 | B2 * | 2/2014 | Kihara .................... | H04M 1/24 455/67.14 |

FOREIGN PATENT DOCUMENTS

JP    2012195895 A    10/2012

\* cited by examiner

*Primary Examiner* — Quochien B Vuong
(74) *Attorney, Agent, or Firm* — Pearne & Gordon LLP (57) ABSTRACT

A mobile terminal testing apparatus that is capable of simulating a state where an electric wave to multiple mobile communication terminals causes interference. The mobile terminal testing apparatus includes: a scenario processing unit that controls each unit of an apparatus in order to perform each procedure for testing according to a test scenario; a cell initialization processing unit that initializes a cell that is subject to interference and an interfering cell that interferes with the cell that is subject to the interference, with a parameter for the cell that is subject to the interference, and a parameter for the interfering cell; and a cell combination processing unit that adjusts output levels of a signal of the cell that is subject to the interference and a signal of the interfering cell and performs combination in order to simulate an interference state.

8 Claims, 4 Drawing Sheets

| Downlink (BTS SIDE) | | | | |
|---|---|---|---|---|
| | BTS#1 | | BTS#2 | |
| | Ant#1 | Ant#2,#3,#4 | Ant#1 | Ant#2,#3,#4 |
| ☐ Frequency [MHz] | | 2110.0 | | 2110.0 |
| ☐ Frequency Offset [MHz] | ... | ... | ... | ... |
| ☐ Timing Offset [Ts] | ... | ... | ... | ... |
| ☐ Cell-specific RS [dBm/15kHz] | -33.3 | -33.3 | -33.3 | -33.3 |
| ☐ UE-specific RS (with Cell-specific RS) [dBm/15kHz] | -55.5 | -55.5 | -55.5 | -55.5 |
| ☐ UE-specific RS (without Cell-specific RS) [dBm/15kHz] | -55.5 | -55.5 | -55.5 | -55.5 |
| ☐ MBSFN RS [dBm/15kHz] | ... | ... | ... | ... |
| ☐ Positioning RS [dBm/15kHz] | ... | ... | ... | ... |

FIG. 3A

| Downlink (BTS SIDE) | | | | |
|---|---|---|---|---|
| | BTS#1 | | BTS#2 | |
| | Ant#1 | Ant#2,#3,#4 | Ant#1 | Ant#2,#3,#4 |
| ☐ Frequency [MHz] | | 2110.0 | | 2110.0 |
| ☐ Frequency Offset [MHz] | ... | ... | ... | ... |
| ☐ Timing Offset [Ts] | ... | ... | ... | ... |
| ☐ Cell-specific RS [dBm/15kHz] | -33.3 | -33.3 | -99.9 | -99.9 |
| ☐ UE-specific RS (with Cell-specific RS) [dBm/15kHz] | -55.5 | -99.9 | -99.9 | -55.5 |
| ☐ UE-specific RS (without Cell-specific RS) [dBm/15kHz] | -55.5 | -99.9 | -99.9 | -55.5 |
| ☐ MBSFN RS [dBm/15kHz] | ... | ... | ... | ... |
| ☐ Positioning RS [dBm/15kHz] | ... | ... | ... | ... |

MOBILE TERMINAL TESTING APPARATUS AND INTERFERENCE STATE SIMULATING METHOD FOR USE IN THE SAME

TECHNICAL FIELD

The present invention relates to a mobile terminal testing apparatus that performs communication between the mobile terminal testing apparatus and a mobile communication terminal in order to perform testing of the mobile communication terminal.

BACKGROUND ART

A mobile terminal testing apparatus for performing testing to determine whether or not a mobile communication terminal performs communication normally in accordance with communication standards is used in developing the mobile communication terminal such as a mobile phone or a data communication terminal. A communication sequence, in which a wireless signal between the mobile terminal testing apparatus and the mobile communication terminal is set and in which a signal that is transmitted and received between the mobile terminal testing apparatus and the mobile communication terminal is set, is created in advance as a testing scenario and is stored in the mobile terminal testing apparatus. The mobile terminal testing apparatus operates as one or more pseudo-base stations according to the testing scenario, communicates with the mobile communication terminal that is a testing target, and performs the testing.

In recent years, as mobile communication standards, such as Long Term Evolution-Advanced (LTE-A), in order to improve a communication rate, a Multi-Input Multi-Output (MIMO) scheme has been proposed in which signals in the same frequency band (hereinafter referred to as a "cell") are transmitted at the same time from multiple antennas that are provided to both a base station and a mobile communication terminal, and are received and demultiplexed in the multiple antennas.

It is disclosed in Patent Document 1 that fading processing is performed on multiple signals, MIMO wireless signals are simulated, and MIMO testing is performed.

RELATED ART DOCUMENT

Patent Document [Patent Document 1]
JP-A-2012-195895

DISCLOSURE OF THE INVENTION

Problem that the Invention is to Solve

Additionally, Multi-User-MIMO (MU-MIMO), an improved version of a MIMO technology, has been proposed in which communication in the same frequency is performed through multiple antennas between the base station and the multiple mobile communication terminals.

Testing for interference due to an electric wave to multiple communication terminals is required when performing testing of the mobile communication terminal that supports such MU-MIMO.

However, in order to simulate the state where the electric wave to the multiple mobile communication terminals causes interference, a cell common portion has to be provided to the mobile communication terminals for common use, and a portion specific to the mobile communication terminal has to be provided to every mobile communication terminal. It is thought that in order to realize this, multiple mobile terminal testing apparatuses are connected to one another with a common portion of a signal being synchronized, but a cost associated with this increases.

Therefore, an object of the present invention is to provide a mobile terminal testing apparatus that is capable of simulating a state where an electric wave to multiple mobile communication terminals causes interference without using multiple mobile terminal testing apparatuses.

Means for Solving the Problem

According to an aspect of the present invention, there is provided a mobile terminal testing apparatus that simulates a base station for mobile communication in order to test a mobile communication terminal, the mobile terminal testing apparatus including: a cell initialization processing unit that initializes a cell that is subject to interference and an interfering cell that interferes with the cell that is subject to the interference, with a parameter for the cell that is subject to the interference, which is set in advance, and a parameter for the interfering cell, which is set in advance; and a cell combination processing unit that adjusts output levels of a signal of the cell that is subject to the interference and a signal of the interfering cell and performs combination in order to simulate an interference state.

With this configuration, multiple cells of the mobile terminal testing apparatus are combined and the interference state is simulated. Because of this, a state where the electric wave to multiple mobile communication terminals causes interference can be simulated, without using multiple terminal testing apparatuses.

Furthermore, in the mobile terminal testing apparatus according to the aspect of the present invention, the cell initialization processing unit may create the parameter for the interfering cell from the parameter for the cell that is subject to interference, based on the designated interference method.

With this configuration, the interference method is designated, and the parameter for the interfering cell is created. Because of this, the state where the electric wave to the multiple mobile communication terminals causes the interference can be easily simulated.

Furthermore, in the mobile terminal testing apparatus according to the aspect of the present invention, the cell combination processing unit may simulate the cell that is subject to the interference, with output to a primary antenna of the mobile communication terminal, and may simulate the interfering cell, with output to a secondary antenna of the mobile communication terminal.

With this configuration, the cell that is subject to interference is adjusted with the output to the primary antenna, the interfering cell is adjusted with the output to the secondary antenna, and combination of the cells is performed. Because of this, adjustment of the cell that is subject to the interference and of the interfering cell can be easily performed, and the state where the electric wave to the multiple mobile communication terminals causes the inference can be easily simulated.

In the mobile terminal testing apparatus according to the aspect of the present invention, the cell combination processing unit may disable output of a cell-specific portion to the secondary antenna in the cell that is subject to the interference, may disable the output to the primary antenna in the interfering cell and output of a cell common portion to the secondary antenna, and may perform the combination of the cells.

With this configuration, the cell that is subject to the interference is simulated with the output to the primary antenna, and the cell common portion of the cell that is subject to interference and the cell-specific portion of the interfering cell are combined with each other, with the output to the secondary antenna. Because of this, the state where the electric wave to multiple mobile communication terminals causes the interference can be easily simulated.

According to another aspect of the present invention, there is provided an interference state simulation method for use in a mobile terminal testing apparatus that simulates a base station for mobile communication in order to test a mobile communication terminal, the method including: initializing a cell that is subject to interference and an interfering cell that interferes with the cell that is subject to the interference, with a parameter for the cell that is subject to the interference, which is set in advance, and a parameter for the interfering cell, which is set in advance; and simulating an interference state by adjusting output levels of a signal of the cell that is subject to the interference and a signal of the interfering cell and performing combination.

Furthermore, in the interference state simulation method according to the aspect of the present invention, the initializing of the cell may be to create the parameter for the interfering cell from the parameter for the cell that is subject to the interference, based on an interference method that is designated.

Furthermore, in the interference state simulation method according to the aspect of the present invention, the simulating of the interference state may be to simulate the cell that is subject to the interference, with output to a primary antenna of the mobile communication terminal, and may be to simulate the interfering cell, with output to a secondary antenna of the mobile communication terminal.

Furthermore, in the interference state simulation method according to the aspect of the present invention, the simulating of the interference state may be to disable output of a cell-specific portion to the secondary antenna in the cell that is subject to the interference, and may be to disable the output to the primary antenna in the interfering cell and output of a cell common portion to the secondary antenna.

With this configuration, the multiple cells of the mobile terminal testing apparatus are combined and the interference state is simulated. Because of this, the state where the electric wave to the multiple mobile communication terminals causes the interference can be simulated, without using the multiple mobile terminal testing apparatuses.

Advantage of the Invention

According to the present invention, there can be provided a mobile terminal testing apparatus that is capable of simulating a state where an electric wave to multiple mobile communication terminals causes interference without using multiple mobile terminal testing apparatuses.

BEST MODE FOR CARRYING OUT THE INVENTION

Figure 1:
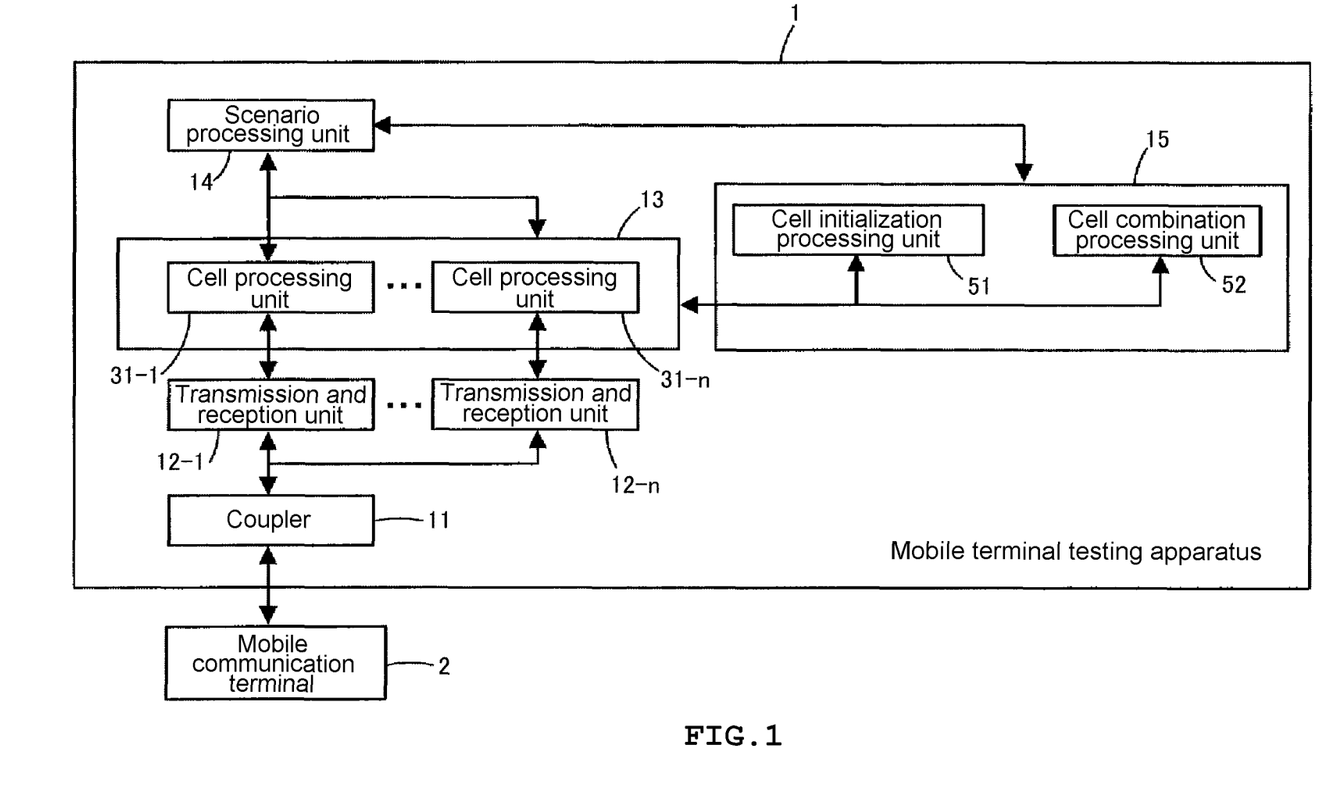
FIG. 1 is a block diagram of a mobile terminal testing apparatus according to an embodiment of the present invention.

Embodiments of the present invention will be described in detail referring to the drawings. In FIG. 1, a mobile terminal testing apparatus 1 according to one embodiment of the present invention is configured in such a manner as to transmit and receive a wireless signal to and from a mobile communication terminal 2 in a wired manner through a coaxial cable or the like, as a pseudo- base station. Moreover, the mobile terminal testing apparatus 1 may be set up in such a manner to transmit and receive a signal to and from the mobile communication terminal 2 in a wireless manner through an antenna.

The mobile terminal testing apparatus 1 supports LTE-A standards, and is configured in such a manner that communication can be performed between the mobile terminal testing apparatus 1 and the mobile communication terminal 2, using an MU-MIMO technology. In a case of performing a MIMO testing, the mobile terminal testing apparatus 1 is configured in such a manner that, in accordance with an antenna configuration of the mobile communication terminal 2, antenna terminals of the mobile communication terminal 2 are connected to corresponding input and output terminals, respectively, in a wired manner and that wireless signals are output from the input and output terminals to corresponding antennas, respectively.

The mobile terminal testing apparatus 1 is configured to include a coupler 11, multiple transmission and reception units 12-1 to 12-$n$, a layer processing unit 13, a scenario processing unit 14, an interference processing unit 15.

The coupler 11 is a circuit element that connects the mobile communication terminal 2 that is a testing target and the transmission and reception units 12-1 to 12-$n$ to one another. The coupler 11 couples wireless signals that are transmitted by the transmission and reception units 12-1 to 12-$n$, respectively, and transmits the resulting signal to the mobile communication terminal 2. Furthermore, the coupler 11 transmits to each of the transmission and reception units 12-1 to 12-$n$ a signal that is received from the mobile communication terminal 2. The coupler 11 includes multiple input and output terminals that connect to the mobile communication terminal 2. The mobile terminal testing apparatus 1 is configured in such a manner that a user can set the input and output terminals that correspond to antennas, respectively, of the pseudo-base station. Based on the setting by the user, the coupler 11 performs output coupling with outputs from the transmission and reception units 12-1 to 12-$n$ and the input and output terminals being associated with one another, and performs input distribution with the input and output terminals and inputs to the transmission and reception units 12-1 to 12-$n$ being associated with one another.

The transmission and reception units 12-1 to 12-$n$ generate a transmission signal in a baseband from an output signal from the layer processing unit 13, frequency-converts the generated transmission signal into a signal in a Radio Frequency (RF), power-amplifies a signal that results from the frequency-conversion, and transmits a signal that results from the power amplification to the mobile communication terminal 2 through the coupler 11. In the case of performing the MIMO testing, the transmission and reception units 12-1 to 12-*n* are set up in a such a manner as to generate output signals to multiple antennas, respectively, of the mobile communication terminal 2. Further, each of the transmission and reception units 12-1 to 12-*n* frequency-converts the signal in the RF band, which is transmitted from the mobile communication terminal 2 and is received through the coupler 11, into a signal in the base band, acquires the signal in the base band as a reception signal, and outputs the required signal to the layer processing unit 13.

The layer processing unit 13 performs signal processing that is based on given communication protocols and, therefore, performs layer processing of each communication protocol that is layer-configured to have multiple layers. The layer processing unit 13 has multiple cell processing units 31-1 to 31-*n*.

The cell processing units 31-1 to 31-*n* transmit and receive wireless signals between the cell processing units 31-1 to 31-*n* and the mobile communication terminal 2, through the transmission and reception units 12-1 to 12-*n*, respectively, and, as one cell, perform call control. The cell processing units 31-1 to 31-*n* are set up in such a manner as to set parameters for the corresponding transmission and reception units 12-1 to 12-*n*, respectively. Furthermore, the cell processing units 31-1 to 31-*n* are set up in such a manner that the cell processing units 31-1 to 31-*n* can adjust output levels of output signals from the corresponding transmission and reception units 12-1 to 12-*n*, respectively.

The scenario processing unit 14 retains a testing scenario in which procedures for configuration and testing of the mobile terminal testing apparatus 1 are described, and controls each unit of the apparatus in order to perform each procedure for the testing according to the testing scenario.

According to an instruction from the scenario processing unit 14, the interference processing unit 15 causes a parameter for a cell to be set to be in the layer processing unit 13, based on an interference method that is designated, performs combination of multiple cells, and thus causes an interfere state due to an electric wave to multiple mobile communication terminals 2 to be simulated. The interference processing unit 15 includes a cell initialization processing unit 51 and a cell combination processing unit 52.

The cell initialization processing unit 51 creates a parameter for an interfering cell, based on the interference method that is designated by the scenario processing unit 14, and on a parameter for a cell that is subject to interference, and instructs the layer processing unit 13 to perform cell initialization and to start cell processing. Moreover, the parameter for the interfering cell may be set.

Based on the interference method that is designated by the scenario processing unit 14, the cell combination processing unit 52 changes configurations of the cell that is subject to interference and the interfering cell and causes the interference state to be simulated.

At this point, the mobile terminal testing apparatus is configured as a computer in which a communication module for performing communication with the mobile communication terminal 2 is provided, which is not illustrated. The computer has a Central Processing Unit (CPU), a Read Only Memory (ROM), a Random Access Memory (RAM), a hard disk drive, input and output ports, and a touch panel, all of which are not illustrated.

Stored in the ROM and the hard disk drive of the computer is a program for causing the computer to function as the mobile terminal testing apparatus 1. That is, the computer functions as the mobile terminal testing apparatus 1 by the CPU executing the program that is stored in the ROM with the RAM as a working area.

In this manner, according to the present embodiment, the scenario processing unit 14 is configured as the CPU, and the transmission and reception units 12-1 to 12-*n*, the layer processing unit 13, and the interference processing unit 15 are configured as the communication module.

In a case of performing testing of the mobile communication terminal 2 with the mobile terminal testing apparatus 1 that has such a configuration, a scenario that is used for testing is first created by the user. The creation of the testing scenario may be performed by a different apparatus. By the user operating a touch panel, for example, by displaying a testing scenario creation screen on the touch panel, information on a pseudo cell, a sequence that the user wants to perform, or the like is set in the cell processing unit 31-1 to 31-*n*.

The user sets various pieces of information for every base station in accordance with intended testing. At this point, in a case of performing interference testing in MU-MIMO, for example, the parameter for the cell that is subject to interference nd the interference method are set.

Based on information that is set, the scenario processing unit 14 generates broadcast information, sequence information, or the like, and causes the generated information, as a scenario for the pseudo-base station, to be stored in a storage device such as a hard disk drive, in a state of being associated with identification information.

Furthermore, in a case of performing testing in which multiple base stations are used, the user sets in-cell arrangement of the multiple base stations. Based on information on the in-cell arrangement that is set, the scenario processing unit 14 automatically generates neighboring-cell information for broadcast information of a testing scenario for a pseudo-base station that is set to be used, or the like, and causes the generated neighboring-cell information to be stored in the storage device such as the hard disk drive, in a state of being associated with the testing scenario for the pseudo-base station that is to be used as a testing scenario for in-cell arrangement and with identification information of the pseudo base station.

Moreover, a testing scenario that is created in a different apparatus is stored in the storage device such as the hard disk drive of the mobile terminal testing apparatus 1 through an external storage medium, in a state of being associated with the identification number.

After such a testing scenario is created, the user connects the mobile terminal testing apparatus 1 and the mobile communication terminal 2 to each other in a wired manner and, based on the identification information, selects the scenario for the pseudo-base station that is to be used, or the scenario for in-cell arrangement.

The scenario processing unit 14 reads from the storage device the testing scenario that is associated with the identification information of the testing scenario for the pseudo base station that is selected or of the testing scenario for in-cell arrangement, notifies the layer processing unit 13 of details of the broadcast information, transmission information in location registration processing, or the like, based on the testing scenario that is read, and causes the layer processing unit 13 to operate as a pseudo-base station.

After the testing scenario for the pseudo-base station that is to be used is selected, the user performs location registration, such as powering-on of the mobile communication terminal 2, and checks whether or the location registration is performed normally at the mobile terminal testing apparatus 1 side.

When, in a state where the location registration is performed, an operation of performing a sequence that is set to be in the testing scenario for the pseudo-base station is performed by the user operates the touch panel or the like, the scenario processing unit 14 causes a wireless signal to be transmitted from the layer processing unit 13 based on information on the designated sequence, or causes a wireless signal to be transmitted from the layer processing unit 13 in response to the wireless signal that is received from the mobile communication terminal 2.

In the mobile terminal testing apparatus 1, according to the instruction from the scenario processing unit 14, the interference processing unit 15 sets the parameter for a cell to be in the layer processing unit 13, based on the designated interference method, performs the combination of multiple cells, and thus causes the interference state due to the electric wave to the multiple mobile communication terminals 2, to be simulated.

The interference processing unit 15 creates the parameter for the interfering cell based on the parameter for the cell that is subject to the interference, which is designated by the scenario processing unit 14, and on the interference method, and sets that parameter to be in a cell that is not used.

Then, after performing the initialization and starting the processing of both cells, the interference processing unit 15 adjusts outputs from the both cells, and thus performs the combination of the cells and causes the interference state due to the electric wave to the multiple mobile communication terminal 2, to be simulated.

The interference processing unit 15 causes a signal of the cell that is subject to interference and a signal of the interfering cell to be output as signals of individual pseudo-base stations. The interference processing unit 15 adjusts outputs from pseudo-base stations to multiple antennas of the mobile communication terminal 2, respectively, and thus causes the combination of the cells to be performed.

Specifically, for a parameter relating to a cell common portion of the cell that is subject to interference, for example, relating to a Physical Downlink Control Channel (PDCCH) in LTE, the cell initialization processing unit 51 sets the parameter for the cell that is subject to interference, without any change, as the parameter for the interfering cell.

Furthermore, based on the designated interference method, the cell initialization processing unit 51 creates the parameter for the interfering cell, from a parameter relating to a cell-specific portion of the cell that is subject to interference, for example, relating to a Physical Downlink Shared Channel (PDSCH) in LTE.

According to a cell initialization instruction from the scenario processing unit 14, the cell initialization processing unit 51 instructs the layer processing unit 13 to perform the initialization of the cell that is subject to interference and the interfering cell, with their respective parameters. Then, according to a cell processing starting instruction from the scenario processing unit 14, the cell initialization processing unit 51 instructs the layer processing unit 13 to start the processing of the cell that is subject to interference and the interfering cell.

Thereafter, according to a cell combination instruction from the scenario processing unit 14, the cell combination processing unit 52 causes an output from the cell that is subject to interference to a primary antenna of the mobile communication terminal 2, to be enabled without any change, and causes output of a cell-specific portion of an output to a secondary antenna of the mobile communication terminal 2, to be disabled. In the same time, the cell combination processing unit 52 causes an output from the interfering cell to a primary antenna of the mobile communication terminal 2 to be disabled, and causes only the cell-specific portion to be output, in a state of causing output of the cell common portion to the secondary antenna of the mobile communication terminal 2 to be disabled.

By doing this, the output from the cell that is subject to interference to the primary antenna operates as one cell, and an interfering cell is formed in the cell common portion of an output from the cell that is subject to interference to the secondary antenna, and in the cell- specific portion of an output from the interfering cell to the secondary antenna.

Figure 2:
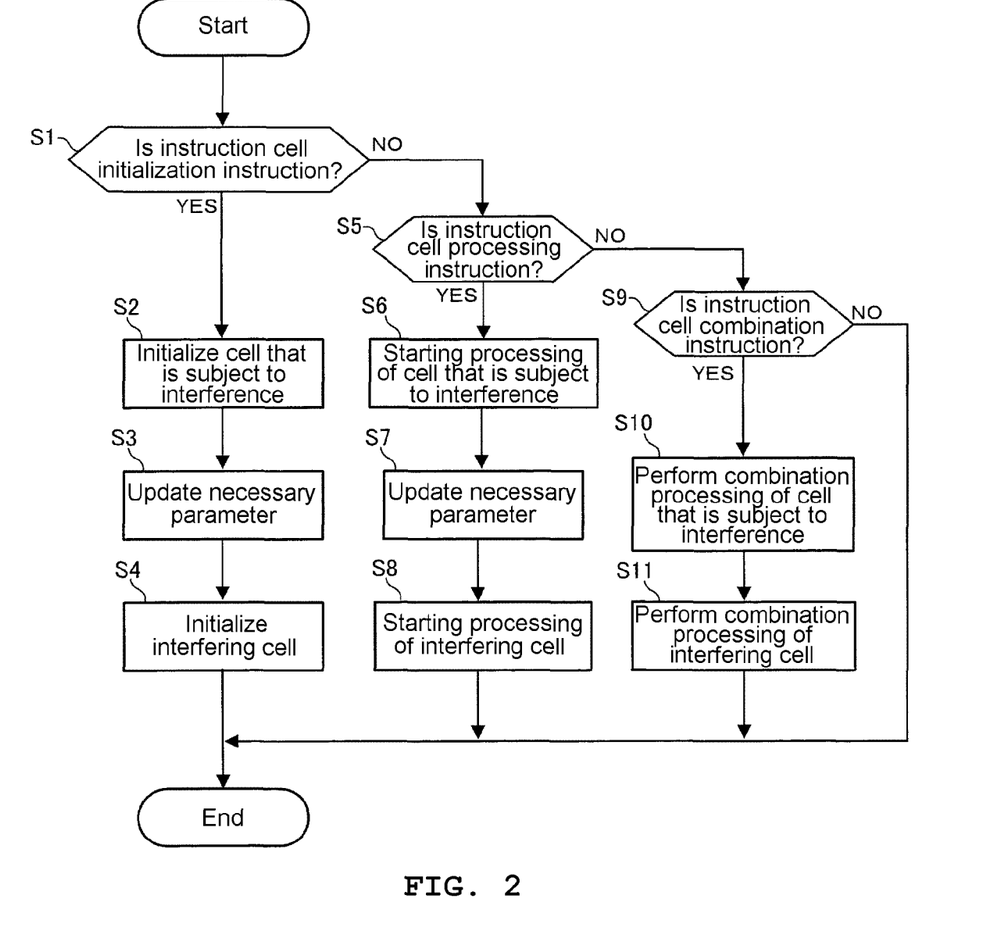
FIG. 2 is a flowchart for describing a procedure for interference state simulating processing by the mobile terminal testing apparatus according to the embodiment of the present invention.

Interference state simulating processing by the mobile terminal testing apparatus 1 according the present embodiment, which is configured above, is described referring to FIG. 2. Moreover, the interference state simulating processing, which will be described below, is performed each time the interference processing unit 15 receives an instruction from the scenario processing unit 14.

First, the interference processing unit 15 determines whether or not the instruction from the scenario processing unit 14 is the cell initialization instruction (Step S1). In a case where the instruction from the scenario processing unit 14 is the cell initialization instruction, the interference processing unit 15 causes the cell initialization processing unit 51 to perform the initialization of the cell that is subject to interference, with a parameter that is set in advance (Step S2), and causes the cell initialization processing unit 51 to perform update of the parameter for the cell that is subject to interference, which needs to be changed, and to generate a parameter for the initialization of the interfering cell (Step S3), and causes the cell initialization processing unit 51 to perform the initialization of the interfering cell, with the generated parameter (Step S4).

On the other hand, in a case where it is determined in Step S1 that the instruction from the scenario processing unit 14 is not the cell initialization instruction, the interference processing unit 15 determines whether or not the instruction from the scenario processing unit 14 is the cell processing starting instruction (Step S5). In a case where the instruction from the scenario processing unit 14 is the cell processing starting instruction, the interference processing unit 15 causes the cell initialization processing unit 51 to start the processing of the cell that is subject to interference, with a parameter that is set in advance (Step S6), and causes the cell initialization processing unit 51 to perform the update of the parameter for the cell that is subject to interference, which needs to be changed, and to generate a parameter for starting the processing of the interfering cell (Step S7), and causes the cell initialization processing unit 51 to start the processing of the interfering cell, with the generated parameter (Step S8).

On the other hand, in a case where it is determined in Step S5 that the instruction from the scenario processing unit 14 is not the processing starting instruction, the interference processing unit 15 determines whether or not the instruction from the scenario processing unit 14 is the cell combination instruction (Step S9). In a case where it is determined that the instruction from the scenario processing unit 14 is the cell combination instruction, the interference processing unit 15 causes the cell combination processing unit 52 to decrease the output of the cell-specific portion of the cell that is subject to interference to the secondary antenna and to perform combination processing of the cell that is subject to interference (Step S10), and causes the cell combination processing unit 52 to decrease the output from the interfering cell to the primary antenna and the output of the cell common portion to the secondary antenna and to perform the combination processing of the interfering cell (Step S11).

On the other hand, in a case where it is determined in Step S9 that the instruction from the scenario processing unit 14 is not the cell combination instruction, the interference processing unit 15 ends the processing. As described above, the above-described interference state simulating processing is performed each time the interference processing unit 15 receives the instruction from the scenario processing unit 14 and, therefore, the interference state that is simulated varies with time.

Figure 3A:
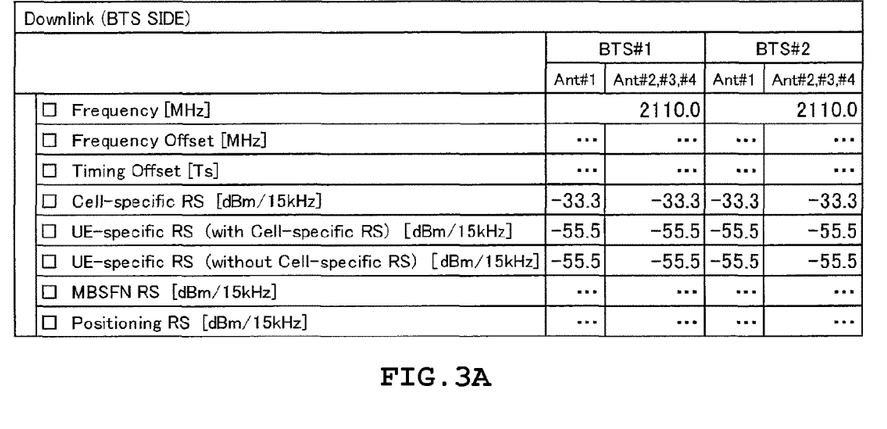
FIGS. 3A and 3B are diagrams illustrating a power of output to an antenna that results from the interference state simulating processing by the mobile terminal testing apparatus according to the embodiment of the present invention.
Figure 3B:
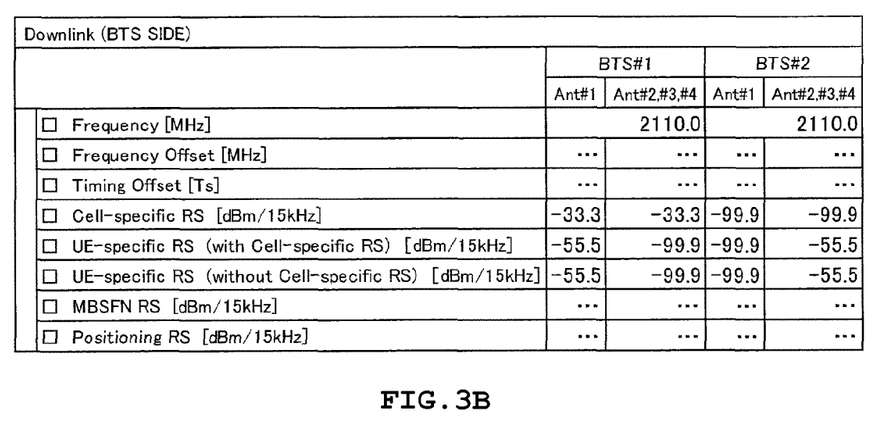
Figure 4:
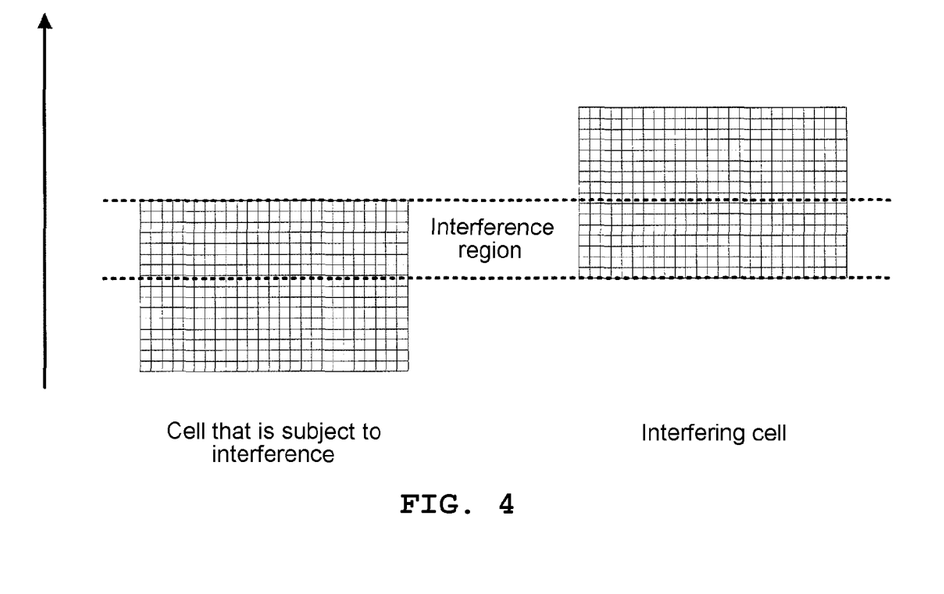
FIG. 4 is a diagram illustrating an image of the interference state in the mobile terminal testing apparatus according to the embodiment of the present invention.

Operations according to the interference state simulating processing are described referring to FIGS. 3A, 3B and 4. FIGS. 3A and 3B illustrates an output power of a signal that is output by each pseudo-base station to each antenna. Moreover, among values in a table, a value of "−99.9" indicates that the output is disabled.

When according to the cell processing starting instruction from the scenario processing unit 14, the interference processing unit 15 causes the cell processing to be performed, as illustrated in FIG. 3A, at a frequency of 2110.0 MHz that is shown in each of the columns pseudo-base stations BTS #1 and BTS #2 and in the row "Frequency [MHz]", both of an output power of the cell common portion that is shown in the row "Cell-specific RS [dBm/15 kHz]", and output powers of the cell-specific portions that are shown in the rows "UE-specific RS (with Cell-specific RS) [dBm/15 kHz]" and "UE-specific RS (without Cell-specific RS) [dBm/15 kHz]" go up, and thus the pseudo-base stations BTS #1 and BTS #2 operate individually.

When according to the cell combination instruction from the scenario processing unit 14, the interference processing unit 15 causes the combination of the cell to be performed, as illustrated in FIG. 3B, at a frequency of 2110.0 MHz that is shown in each of the columns pseudo-base stations BTS #1 and BTS #2 and in the row "Frequency [MHz]", the output to the secondary antennas (Ant #2, #3, and #4) of the pseudo-base station BTS #1 is disabled (a value is −99.9) in a state of "UE-specific RS (with Cell-specific RS) [dBm/15 kHz]" and "UE-specific RS (without Cell-specific RS) [dBm/15 kHz]", the output to the primary antenna (Ant #1) of the pseudo-base station BTS #2 is disabled, the output of the cell common portion to the secondary antennas (Ant #2, #3, and #4) is also disabled in a state of "Cell-specific RS [dBm/15 kHz]", and thus the output to a main antenna of the pseudo-base station BTS #1 operates as one cell, and operates as the interfering cell in the cell common portion of the output to the secondary antenna of the pseudo-base station BTS #1 and in the cell-specific portion of the output to the secondary antenna of the pseudo-base station #2.

When we take a look at allocation of a frequency to the cell-specific portion at a certain time, as illustrated in FIG. 4, one interference region is present in the cell that is subject to interference and the interfering cell.

In this manner, according to the embodiment described above, the cell initialization processing unit 51 that initializes the cell that is subject to interference and the interfering cell, with the parameter for the cell that is subject to interference and the parameter for the interfering cell, and the cell combination processing unit 52 that adjusts output levels of the signals of the cell that is subject to interference and of the interfering cell, performs the combination of the cells, and thus causes the interference state to be simulated are included.

Accordingly, multiple cells of the mobile terminal testing apparatus 1 are combined and the interference state is simulated. Because of this, a state where the electric wave to multiple mobile communication terminals 2 causes interference can be simulated, without using multiple mobile terminal testing apparatuses 1.

Furthermore, the cell initialization processing unit creates the parameter for the interfering cell that, from the parameter for the cell that is subject to interference, based on the designated interference method.

Accordingly, the interference method is designated, the parameter for the interfering cell is created, and thus the state where the electric wave to multiple mobile communication terminals 2 causes interference is simulated.

Furthermore, the cell combination processing unit 52 simulates the cell that is subject to interference, with the output to the primary antenna of the mobile communication terminal 2, and simulates the interfering cell, with the output to the secondary antenna, to be simulated.

Accordingly, the cell that is subject to interference is adjusted with the output to the primary antenna, the interfering cell is adjusted with the output to the secondary antenna, and thus the adjustment of the cell that is subject to interference and of the interfering cell can be easily performed.

Furthermore, the cell combination processing unit 52 disables the output of the cell-specific portion from the cell that is subject to interference to the secondary antenna, disables the output from the interfering cell to the primary antenna and the output of the cell common portion to the secondary antenna are disabled, and thus the combination of the cells is performed.

Accordingly, the cell that is subject to interference is simulated with the output to the primary antenna, the cell common portion of the cell that is subject to interference and the cell-specific portion of the interfering cell are combined with each other, with the output to the secondary antenna, and thus the interfering cell can be easily combined.

The embodiment of the present invention is disclosed, and it is apparent to a person of ordinary skill in the related art that modifications to the embodiment are possible within the scope that does not depart from the nature and gist of the present invention. All of these modifications and equivalents are intended to be included in the following claims.

DESCRIPTION OF REFERENCE NUMERALS AND SIGNS

1 MOBILE TERMINAL TESTING APPARATUS
2 MOBILE COMMUNICATION TERMINAL
11 COUPLER
12-1 TO 12-$n$ TRANSMISSION AND RECEPTOIN UNITS
13 LAYER PROCESSING UNIT
14 SCENARIO PROCESSING UNIT
15 INTERFERENCE PROCESSING UNIT
31-1 TO 31-$n$ CELL PROCESSING UNIT
51 CELL INITIALIZATION PROCESSING UNIT
52 CELL COMBINATION PROCESSING UNIT

What is claimed is:
1. A mobile terminal testing apparatus that simulates a base station for mobile communication in order to test a mobile communication terminal, the mobile terminal testing apparatus comprising:
a cell initialization processing unit that initializes a cell that is subject to interference and an interfering cell that interferes with the cell that is subject to the interference, with a parameter for the cell that is subject to the interference, which is set in advance, and a parameter for the interfering cell, which is set in advance; and a cell combination processing unit that adjusts output levels of a signal of the cell that is subject to the interference and a signal of the interfering cell and performs combination in order to simulate an interference state.

2. The mobile terminal testing apparatus according to claim 1, wherein the cell initialization processing unit creates the parameter for the interfering cell from the parameter for the cell that is subject to the interference, based on an interference method that is designated.

3. The mobile terminal testing apparatus according to claim 1, wherein the cell combination processing unit simulates the cell that is subject to the interference, with output to a primary antenna of the mobile communication terminal, and simulates the interfering cell, with output to a secondary antenna of the mobile communication terminal.

4. The mobile terminal testing apparatus according to claim 3, wherein the cell combination processing unit disables output of a cell-specific portion to the secondary antenna in the cell that is subject to the interference, disables the output to the primary antenna in the interfering cell and output of a cell common portion to the secondary antenna, and performs the combination of the cells.

5. An interference state simulation method for use in a mobile terminal testing apparatus that simulates a base station for mobile communication in order to test a mobile communication terminal, the method comprising:

initializing a cell that is subject to interference and an interfering cell that interferes with the cell that is subject to the interference, with a parameter for the cell that is subject to the interference, which is set in advance, and a parameter for the interfering cell, which is set in advance; and simulating an interference state by adjusting output levels of a signal of the cell that is subject to the interference and a signal of the interfering cell and performing combination.

6. The interference state simulation method according to claim 5, wherein the initializing of the cell is to create the parameter for the interfering cell from the parameter for the cell that is subject to the interference, based on an interference method that is designated.

7. The interference state simulation method according to claim 5, wherein the simulating of the interference state is to simulate the cell that is subject to the interference, with output to a primary antenna of the mobile communication terminal, and to simulate the interfering cell, with output to a secondary antenna of the mobile communication terminal.

8. The interference state simulation method according to claim 7, wherein the simulating of the interference state is to disable output of a cell-specific portion to the secondary antenna in the cell that is subject to the interference, and to disable the output to the primary antenna in the interfering cell and output of a cell common portion to the secondary antenna.

* * * * *